1

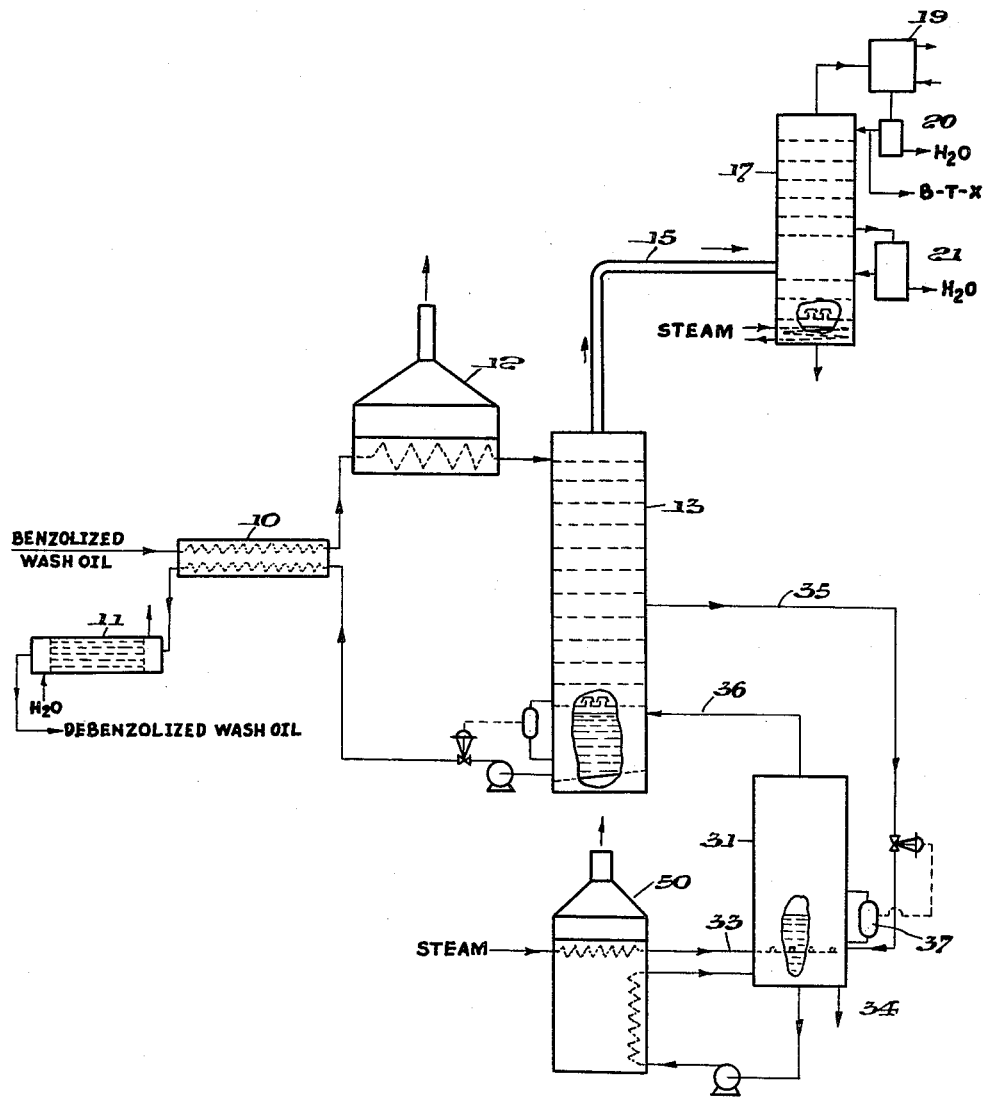

United States Patent Office 2,922,751
Patented Jan. 26, 1960

2,922,751

DEBENZOLIZING WASH OIL

Edward J. Helm, Pittsburgh, Pa., assignor to Koppers Company, Inc., a corporation of Delaware Application January 31, 1957, Serial No. 637,395

3 Claims. (Cl. 196—99)

This invention relates generally to the removal of benzene and its homologues from an absorbent liquid.

The vapors of benzene and its homologues are usually recovered from the gases from coke ovens by a process wherein the gases are contacted with an absorbent liquid to remove these vapors from the gas; thereafter the absorbent liquid is subjected to distillation to free the benzene and its homologues from the liquid; and the liquid residue from the distillation reused as absorbent liquid for further contact with the gas. The contacting of the liquid and gas is generally known as "scrubbing"; the absorbent liquid as "wash oil"; and the recovered benzene and its homologues as "light oil"; the liquid leaving the scrubber and more or less saturated with benzol at the temperature and partial pressure of the gas entering the scrubber as "benzolized wash oil"; and the distillation of the absorbent liquid as "stripping"; and the residue from the stripping tower as "debenzolized wash oil."

The wash oil may be a petroleum distillate and have a boiling range of around 300° to 360° C. at atmospheric pressure, and the light oil may have a boiling range of around 78° C. to 200° C.; yet if the benzolized wash oil be subjected to ordinary distillation at atmospheric pressure, it might begin to boil at 250° C. for a solution of 2% of light oil and would have to be heated to around 300° C. or more to remove all of the light oil from the wash oil. In order to remove the light oil at a low temperature, the system is converted from one of two components, i.e., wash oil and light oil, to one of three components by injecting live steam into the mixture. Thereafter the total pressure is the sum of the partial pressures of the components; but, because the distillation is carried out above the normal boiling point of water, there is no water present in the liquid phase and the presence of steam does not substantially change the partial pressures of the other components; and even if liquid phase water were present, the partial pressures of the other components would not be changed materially because of the very low solubility of water in the oil. Since the vapor pressure of the light oil is so great as compared with the vapor pressure of the wash oil, the vapors leaving the still will be essentially light oil and water vapors. The quantity of light oil vaporized by a given quantity of steam under the foregoing conditions is the product of the ratio of their partial pressures at the distillation temperature and the ratio of their molecular weights. Thus, the temperature required for the distillation may be varied as desired by regulating the quantity of steam introduced into the distillation. The higher the temperature at which distillation takes place, the smaller will be the quantity of steam required for the distillation.

The practice heretofore has been to conduct the distillation at the relatively low temperature of between 100 and 140° C. and usually at 115–130° C., thereby utilizing a large quantity of steam to remove the light oil from the wash oil, as for example 0.6–0.8 pound of direct steam per gallon of wash oil stripped. It was customary, therefore, to partially condense the vapors from the stripping tower to remove all the excess water vapor and to recover the heat therefrom by indirect heat exchange with the benzolized wash oil, before the vapors were conducted to a rectifier where the vapors were separated by fractional distillation into the desired hydrocarbon fractions.

I have found that by stripping the light oil vapors from the wash oil at the elevated temperature of between 160° and 200° C. and advantageously at 170°–190° C., the quantity of water vapor required may be maintained low enough that the vapors from the stripping tower may be conducted directly to the rectifying tower without the conventional intermediate partial condensation of the vapors and yet the rectifier can be operated in a normal manner. Such operation presented a problem, however, in purifying the wash oil.

As is well known, impurities tend to build up in the wash oil when the wash oil is used in the cyclic process of absorbing the light oil from coke oven gas by the wash oil, stripping the light oil from the wash oil, and reusing the wash oil for light oil absorption; this tendency being enhanced when the stripping operation is carried out at a high temperature. A common method of purifying the wash oil has involved continuously vaporizing a portion of the wash oil with the steam which is to be used for the debenzolizing of the wash oil, flowing the resulting vapors which are comprised mainly of steam saturated with oil vapors to the stripping tower to supply the stripping steam for removing the light oil from the wash oil, and discharging from the purifier the residue which is comprised mainly of relatively non-volatile impurities. Thus, the problem presented is that when the tower is operated at a high temperature, the quantity of water vapor or steam necessary to strip the light oil from the wash oil is not sufficient to vaporize that quantity of wash oil which is required to be vaporized in the purifier to maintain the necessary degree of purity of the wash oil recycled, if the purifier is operated at the same temperature as normal in the past, which usually represents the highest temperature obtainable by indirect heat transfer from steam condensing at the pressures of 150 to 200 pounds per square inch gauge which is usually found in coke plants.

An object of the present invention, therefore, is to provide a novel system for removing the light oil from a benzolized wash oil while maintaining the required degree of purity of the wash oil being recycled for further benzolizing.

Another object of the invention is to provide a novel system for stripping the light oil from a benzolized wash oil and fractionally distilling the light oil without intermediate condensation of the vapors from the stripper.

A further object of the invention is to debenzolize a benzolized wash oil by a novel process and apparatus wherein light oil is stripped from the benzolized wash oil at an elevated temperature by a mixture of steam and oil vapors resulting from the distillation of a portion of the wash oil from residue containing a large percentage of non-volatile impurities in a purifier with steam; the amount of steam required for the light oil stripping being insufficient to distill enough oil to maintain the desired degree of purity of the wash oil at conventional temperatures for purifier operation, and provision being made for supplying to the residue the additional heat necessary for vaporizing the required amount of wash oil either externally of the purifier or to the steam fed to the purifier, or to both.

The present invention contemplates a novel arrangement wherein the light oil is stripped from benzolized wash oil and sent to a rectifier for separation into desired fractions without intermediate partial condensation of the vapors, the steam for this stripping of light oil from the wash oil being supplied by a mixture of steam and wash oil vapors derived from the distillation of a portion of the wash oil, the heat for the latter distillation being provided by a separate heat source.

The above and further objects and novel features of the invention will appear more fully from the detailed description when the same is read in connection with the accompanying drawing. It is to be expressly understood, however, that the drawing is not intended as a definition of the invention but is for purposes of illustration only.

The single sheet of drawing schematically illustrates an embodiment of the present invention for removing light oil from the wash oil and separating the light oil into distillation fractions while maintaining a predetermined degree of purity of the wash oil.

The gas from the coke oven is usually contacted with the wash oil in large scrubbing towers by flowing the gas upwardly through the tower and the oil downwardly. Such apparatus is conventional, does not constitute a part of the invention, and, therefore, is not shown.

In accordance with the present invention, the benzolized wash oil from a suitable scrubber (not shown) is conducted through a conventional countercurrent oil-to-oil heat exchanger 10 where the benzolized wash oil is heated and debenzolized wash oil is cooled. The debenzolized wash oil is further cooled in a conventional water cooler 11 and returned to the scrubber. The benzolized wash oil, on the other hand, is flowed through a suitable steam or fired heater 12, where the temperature of the oil is raised to 160°–200° C. and preferably to 170°–190° C. The hot benzolized oil is introduced into a conventional bubble-cap tray type stripping tower 13 at an upper portion of the tower. As the wash oil descends through the tower it is subjected to a countercurrent upward flow of steam which removes the light oil as vapors from the wash oil. This mixture of steam and light oil vapors flows directly from tower 13 by way of conduit 15 to the approximate middle of rectifier column 17 wherein the light oil is separated into two fractions; a benzol, toluol, xylol fraction boiling below about 145° C. and a heavy solvent and naphthalene fraction boiling above about 150° C.

Rectifier column 17 may be of a conventional bubble-cap tray type with those trays which constitute the stripping section being fitted with steam coils arranged for immersion in the liquid. Rectification is brought about by the provision of a reflux condenser 19 and a fluid separator 20. The condensate from a condenser 19 is led to separator 20 where the water is separated from the benzol fraction. The water is sent to waste; and the benzol fraction is divided into two portions, one portion being used as product and another portion being returned to the rectifier as reflux. A large portion of the steam originally present in the vapor mixture that is fed to the rectifier is condensed through direct heat exchange with the light oil reflux on the trays of the rectifier. Accordingly, the liquid is withdrawn from the tray above the feed, and the water separated from the oil in separator 21. The water is discharged to waste and the oil is returned to the feed plate.

A purifier 31 is provided to remove from the wash oil the polymerized and non-volatile impurities which tend to accumulate and build up in the wash oil as the wash oil is circulated through the scrubbing and stripping towers. This purifier may be of a conventional steam distilling type unit having at its lower portion a conduit 33 through which steam is introduced, a conduit 35 through which a portion of the wash oil is withdrawn from the stripping column to be vaporized with the steam, a conduit 36 through which the mixture of steam and purified wash oil vapors is sent to the stripping tower to provide the steam for stripping the light oil from the wash oil, and a conduit 34 through which the residue or non-volatile sludge is discharged to remove the impurities. A conventional liquid level controller 37 may also be provided to regulate the amount of oil sent to the purifier.

In accordance with the present invention, the stripping tower 13 is to be operated at an elevated temperature of between 160° and 200° C. and preferably at 170°–190° C. Conventional operation of a stripping tower has been at temperatures of between 100° and 140° C. and usually at temperatures of 115° to 130° C. With the high temperature operation of the present invention, only a small quantity of steam is required and the vapors from stripping tower 13 can be sent directly to the rectifying column 17 without intermediate cooling.

In conventional arrangements as known heretofore, the temperature of the oil purifier is held at 165° to 200° C. by indirect heat exchange with high pressure steam. To vaporize the same quantity of oil with the smaller quantity of steam as used in accordance with the present invention, however, requires purifier 31 to be maintained at a temperature of between 210° and 250° C., and the steam pressures ordinarily available at coke plants are not high enough to provide the temperatures by indirect heat exchange. In order to maintain these higher temperatures in the purifier and to supply the latent heat of vaporization of the wash oil at these temperatures, there is provided a heater 50 which may, for example, be a conventional fired heater. Thus, in accordance with the present invention, the steam entering purifier 31 is passed through heater 50 and superheated to a predetermined extent and/or the residue from purifier 31 is recirculated through heater 50 and raised to a temperature greater than the temperature necessary for vaporizing the required amount of wash oil when brought into direct contact with the amount of stripping steam to be used. The excess temperature of the wash oil provides the latent heat of vaporization of the wash oil to be vaporized. Thus, by way of the heating supplied externally of the purifier, the required quantity of oil may be purified despite the small amount of steam required.

The foregoing has presented a novel arrangement for removing the light oil from benzolized wash oil prior to the recirculation of the wash oil to the scrubber. The stripping tower is operated at a high temperature so as to increase the economy of operation without reducing the efficiency or building up impurities in the wash oil. Provision is made for supplying heat at a high temperature level to the purifier wherein the impurities are removed from the wash oil so that the required quantity of wash oil may be purified despite the small amount of steam required to strip the light oil from the wash oil at the high temperatures of the present invention.

Various changes and modifications may be made in the particular details of the novel arrangement of this invention without departing from the scope of the appending claims.

What is claimed:

1. Apparatus for debenzolizing a benzolized wash oil by removing the light oil from said benzolized wash oil with steam while purifying the wash oil for reuse, comprising a tower adapted to receive said benzolized oil and said steam for removing the light oil as a vapor from said wash oil with said steam, a rectifier adapted to receive said vapor directly from said tower for fractionally distilling said vapor, a purifier adapted to receive a portion of said wash oil from said tower, means for applying direct steam to said portion so that the wash oil of said portion is vaporized to produce a mixture of water and oil vapors and any non-volatile matter remains as residue and including a heater located exterior of said purifier for superheating said steam; a conduit for applying said mixture to said tower to supply said steam for removing the light oil from said benzolized wash oil, and means for circulating a quantity of said residue and oil from said purifier through said heater so as to receive additional heat whereby a greater portion of said oil may be vaporized than is possible with the quantity of direct steam applied to said purifier.

2. Apparatus for removing the light oil from benzolized wash oil while purifying the wash oil for return to a scrubber, comprising a tower for receiving said benzolized oil and steam for removing the light oil as a vapor from said wash oil, rectifier means for fractionally distilling said vapor, said rectifier including reflux means, a purifier adapted to receive steam and a portion of said wash oil from said tower for vaporizing said portion with the steam to produce a mixture of steam and oil vapors while leaving any non-volatile matter as residue, means for applying said mixture to said tower to supply the steam for removing the light oil from said wash oil, heating means located exterior of said purifier for superheating said steam before entering said purifier for applying additional heat to said portion whereby a greater portion of oil is vaporized and means for circulating a quantity of said residue and oil from said purifier through said heater so as to receive additional heat whereby a greater portion of said oil may be vaporized than is possible with the quantity of direct steam applied to said purifier.

3. Apparatus for removing the light oil from benzolized wash oil with stripping steam while purifying the wash oil for return to a scrubber, comprising a stripping tower having a first inlet for receiving said purified wash oil and a second inlet for receiving said stripping steam and wherein the light oil is removed as a vapor from said benzolized wash oil at temperatures of from 160° to 210° C. by said stripping steam, the amount of stripping steam required decreasing as the temperature of the wash oil in the tower is increased, a purifier for receiving a portion of said wash oil to be purified of impurities, means for applying direct steam to said purifier to vaporize said portion whereby a mixture of water and oil vapors is produced while any non-volatile impurities remain as residue, said steam applying means including a heater located exterior of said purifier for superheating said steam, means for applying said vapor mixture to said second inlet to supply said stripping steam to said tower, and means for circulating a quantity of said residue and oil from said purifier through said heater for applying additional heat to said quantity of residue and oil at a temperature level of between 210° and 250° C. whereby a constant portion of wash oil may be purified as the temperature of said wash oil in said tower is raised and less stripping steam is required for removing the light oil from said benzolized oil.

References Cited in the file of this patent
UNITED STATES PATENTS

| | | |
|---|---|---|
| 2,196,878 | Stover | Apr. 9, 1940 |
| 2,472,810 | Denig | June 14, 1949 |

OTHER REFERENCES

"Chemical Engineers Handbook," third edition, 1950, pp. 582 and 583.